United States Patent [19]
Lockwood

[11] Patent Number: 5,669,621
[45] Date of Patent: Sep. 23, 1997

[54] VEHICLE ALIGNMENT DEVICE

[76] Inventor: Van Lockwood, 16 E. Pinestead Rd., Pensacola, Fla. 32503

[21] Appl. No.: 155,645

[22] Filed: Nov. 22, 1993

[51] Int. Cl.⁶ .................................................. B60D 1/06
[52] U.S. Cl. ................................................ 280/477; 33/264
[58] Field of Search ..................... 280/477; 116/28 R; 33/264

[56] References Cited

U.S. PATENT DOCUMENTS

| | | | |
|---|---|---|---|
| 3,363,318 | 1/1968 | Folkins et al. | 280/477 |
| 3,418,628 | 12/1968 | Fenner | 280/477 |
| 3,702,029 | 11/1972 | Anderson, Jr. | 280/477 |
| 3,765,703 | 10/1973 | Voelkerding et al. | 280/477 |
| 3,858,966 | 1/1975 | Lowell, Jr. | 280/477 |
| 4,285,138 | 8/1981 | Berry | 33/264 |
| 4,583,481 | 4/1986 | Garrison | 116/28 R |
| 4,621,432 | 11/1986 | Law | 33/264 |
| 4,666,176 | 5/1987 | Sand | 280/477 |
| 4,723,788 | 2/1988 | Suter | 280/477 |
| 5,035,441 | 7/1991 | Murray | 280/477 |

Primary Examiner—Kevin Hurley
Attorney, Agent, or Firm—Peter Loffler

[57] ABSTRACT

A device for facilitating the alignment of a trailer hitch socket with the ball mounted on the towing vehicle is composed of a fixed sight member, a pivoting sight member, and a stop plate. The pivoting sight member mounts on the edges of the trailer tongue and extends vertically upward to the point which it is visible from the towing vehicle. The fixed sight member is magnetically attached to the towing vehicle and mounted adjacent the towing ball on the trailer hitch. The fixed sight member extends vertically upward to a height at which it is visible from within the towing vehicle. As the vehicle backs up toward the trailer, the driver can see the two sight members and steer such that they will come closer and closer together. When the socket is directly over the ball the pivoting sight member is actuated and signals the driver that alignment is achieved. The stop brace prevents the towing vehicle from colliding with the trailer hitch.

5 Claims, 7 Drawing Sheets

VEHICLE ALIGNMENT DEVICE

BACKGROUND

As is well known in the art, aligning a vehicle with a trailer hitch such that the towing ball of the vehicle aligns approximately with the socket on the tongue of the trailer hitch can be a process of trial and error. Moreover, when only one individual is available to perform this task, the process can be almost impossible.

The ball mounted on the towing vehicle is not visible from the driver's seat so he can only imagine where the ball is located as he backs up toward the tongue of the trailer hitch. As he comes close enough to the trailer, the trailer hitch socket also becomes invisible behind the towing vehicle, so that he must guess where both the towing ball and trailer hitch socket are located.

Naturally, when there is another person around to give verbal and hand signals, it becomes somewhat easier for the driver to align the towing ball with the trailer hitch socket. However, even this arrangement is sometimes difficult, inasmuch as: both the towing ball and trailer hitch socket will disappear from sight before alignment; movement and motions for the assistant are reversed in respect to the view of the driver in the rearview mirror; and when the driver turns to the left, the front of the vehicle moves to the right and the rear of the vehicle moves to the left.

With so many confusing signals to the driver, it is very difficult to properly align the towing ball and trailer hitch socket. Although an experienced driver may make the proper alignment the first time, an inexperienced driver will often need to stop the vehicle, get out and check the alignment, get back in, pull forward and try backing up again.

In addition, depending on the weight of the trailer, the proper alignment with the towing vehicle can be critical. If the trailer tongue is extremely heavy, it will be necessary for the driver to position the towing ball immediately beneath the trailer hitch socket, because virtually no adjustment of the trailer alignment will be possible.

For the foregoing reasons, there is a need for a trailer hitch alignment device that is easy to install and use, is easily and inexpensively manufactured and provides a reliable alignment procedure.

SUMMARY

The present invention is directed to an apparatus that solves the above-stated problem and satisfies the need in a very simple, economic, and straightforward means. A trailer hitch alignment device having features of the present invention comprises a pair of sight members, one of which extends vertically upward in parallel alignment with the vertical centerline of the trailer hitch socket, the second sight member extends vertically upward and parallel with the vertical centerline of the towing ball, and a stop brace removably mounted to the underside of the trailer tongue. The pair of sight members are constructed such that they may be seen directly by the driver of the towing vehicle through the rearview mirror. Naturally, he can also turn around and look at them directly so their directions do not appear to be reversed through the rearview mirror.

The sight member which is mounted above the trailer hitch socket is weight balanced and can pivot in a vertical plane that is defined by the horizontal center line of the trailer tongue. The sight member positioned adjacent the trailer hitch ball is removably mounted to the rear of the towing vehicle and remains fixed at all times. The position of the removable stop brace can be adjusted such that when the towing vehicle makes contact, the trailer hitch socket is in alignment with the towing ball. Finally, the weight balanced sight member is constructed with a moment of inertia such that when the towing vehicle makes contact with the sight member, the weight-balanced sight member pivots in the referenced vertical plane of the trailer tongue.

When the towing vehicle makes contact with the pivoting sight member, the pivoting sight member pivots, and the towing vehicle driver is notified that the towing ball and trailer hitch socket are aligned.

These and other features, aspects, and advantages of the present invention will become better understood with reference to the following description, drawings, and appended claims.

DESCRIPTION

Figure 1:
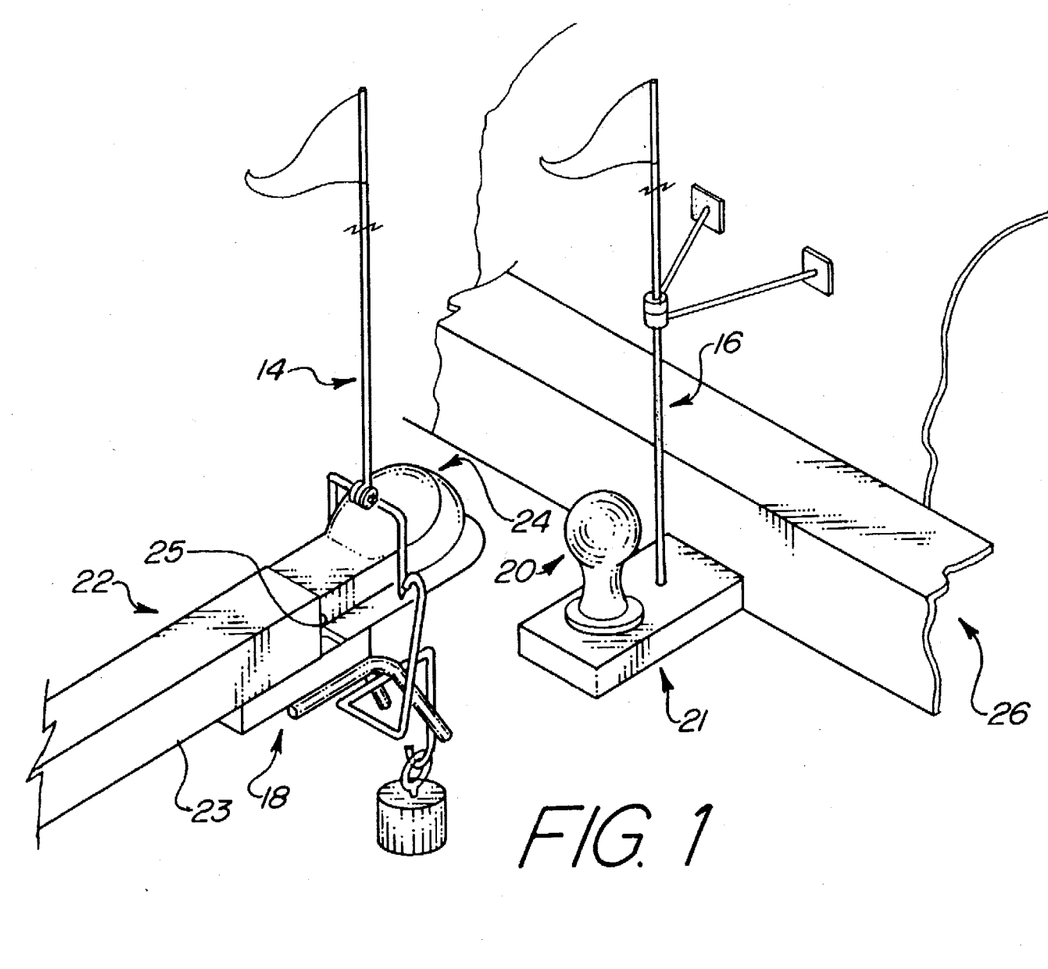
FIG. 1 is a perspective view of the embodiment of the invention mounted on the towing vehicle and the trailer hitch tongue.

As illustrated in FIG. 1, the embodiment of the invention comprises a fixed sight member 16, a pivoting sight member 14, and a stop brace 18. The fixed sight member 16 is vertically disposed and is attached to the towing vehicle 26 and the towing vehicle hitch 21. The pivoting sight member 14 is weight balanced such that the pivoting sight member 14 is vertically disposed when mounted on to the trailer tongue 22. The stop brace 18 is attached to the lower side 23 of the trailer tongue 22 and adjacent to the trailer socket 24.

Figure 2:
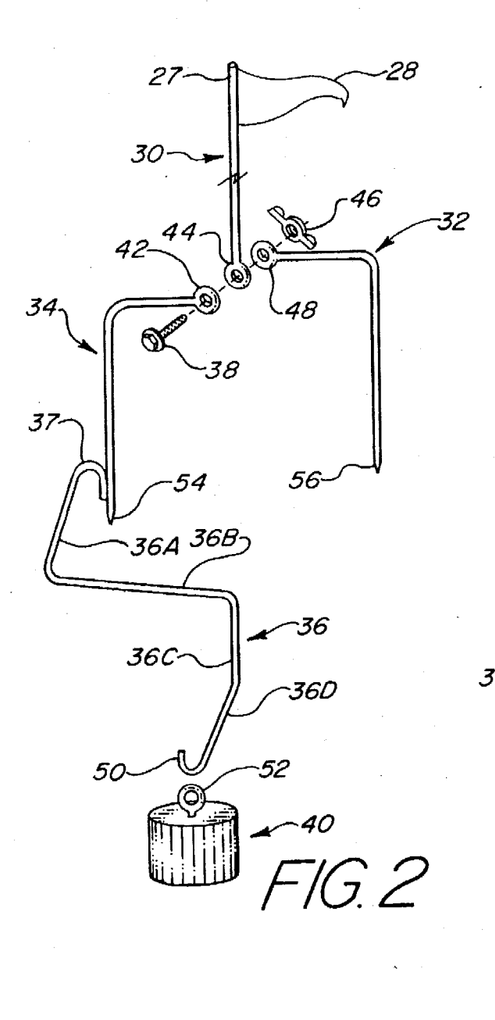
FIG. 2 is an exploded view of the pivoting sight member.

As shown in FIG. 2, the pivoting sight member 14 comprises a vertical member 30, two L-shaped members 32 and 34, a multi-angular member 36, a weight 40, a bolt 38, a wing nut 46, and a sight flag 28.

Figure 3:
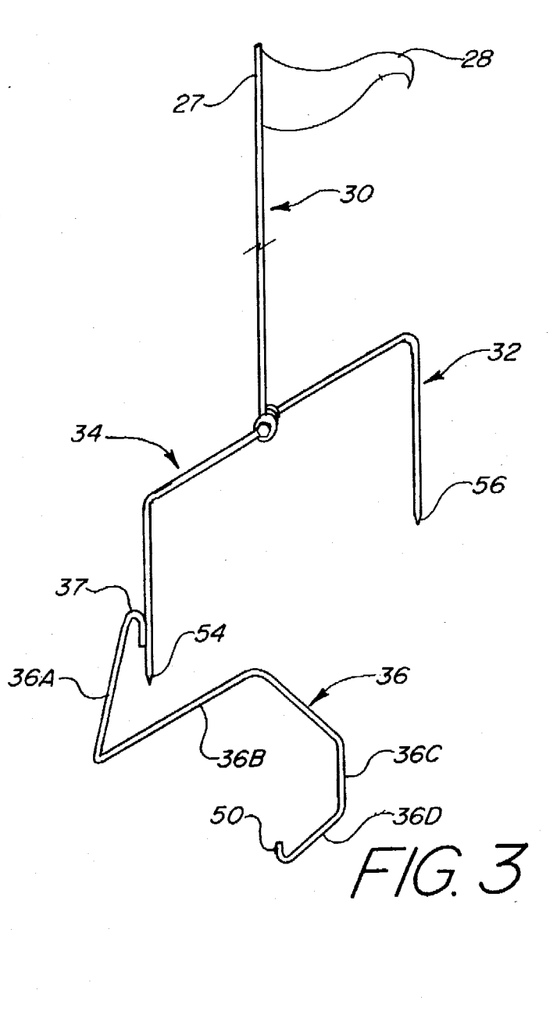
FIG. 3 is a perspective view of the pivoting sight member.
Figure 4:
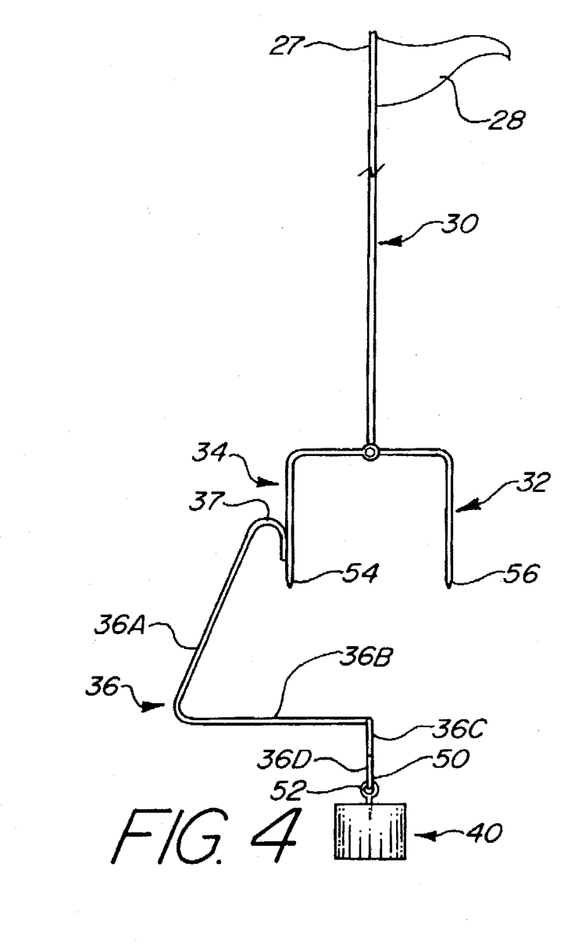
FIG. 4 is an elevational view of the pivoting sight member.
Figure 5:
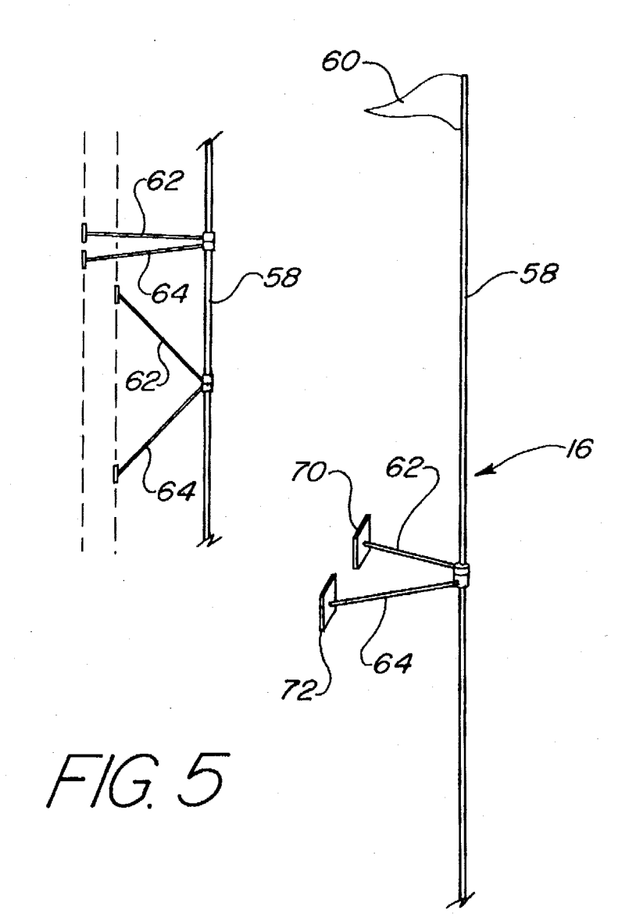
FIG. 5 is a perspective view of the fixed sight member illustrating the attachment positions to the towing vehicle.

As shown in FIGS. 2, 3 and 4, the vertical pivot member 30 comprises a first terminal end 27 suitable for attaching a sight flag 28 and second terminal end 44 having the shape of an islet. The two L-shaped members comprise first terminal ends 42 and 48 having the shape of an islet, second terminal ends 54 and 56 having a contoured shape suitable for load-bearing and pivoting purposes.

A bolt 38, and a wing nut 46, are used to attach the L-shaped members 32 and 34 to the vertical member 30. As shown in FIGS. 2, 3, and 4, the vertical member 30 is attached to the L-shaped members 32 and 34 such that the vertical member 30 is perpendicular to the center line of L-shaped members 32 and 34 which passes through islets 42 and 48.

Figure 3A:
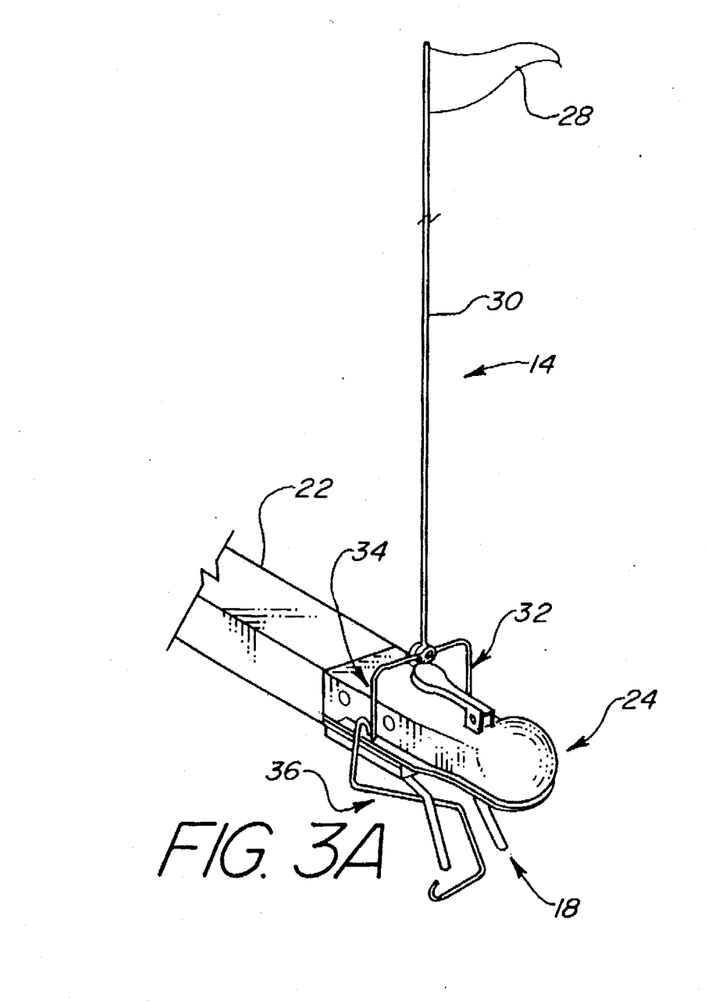
FIG. 3A is a perspective view of the pivoting sight member mounted on the trailer hitch tongue.

The multi-angular shaped member 36 is attached to the L-shaped member 34 in close proximity to the second terminal end 54 of L-shaped member 34. The multi-angular member 36 comprises a first terminal end 37, and a second terminal end 50 shaped in the form of a hook. The first section 36A extends downwardly in the plane defined by the pivoting sight member 14. The second section 36B extends downwardly and away from the plane defined by the pivoting sight member 14. The third section 36C extends vertically downward in a plane parallel to the plane defined by the pivoting sight member 14. The fourth section 36D extends downward towards the plane defined by pivoting sight member 14. As shown in FIG. 3A, the multi-angular member 36 is shaped such that the vertical center line of the third section 36C passes within the circumference of the trailer hitch socket 24 when the pivoting sight member is mounted on the trailer hitch tongue 22.

The weight 40 includes an islet 52 and is attached to the second terminal end 50 of the multangular shaped member 36, as illustrated in FIGS. 2 and 4.

Figure 6:
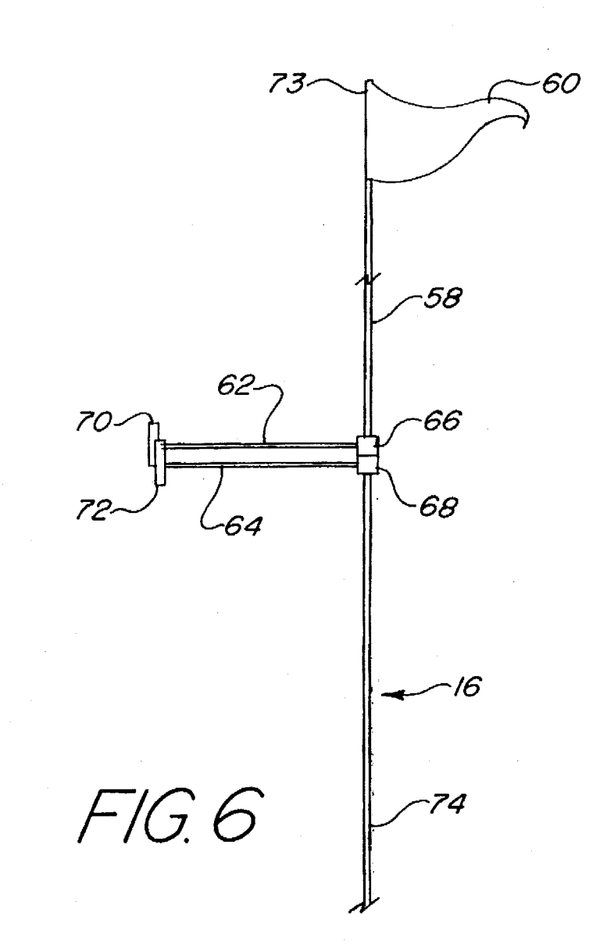
FIG. 6 is an elevational view of the fixed sight member.

As shown in FIG. 6, the fixed sight member 16 is comprised of a vertical member 58, a sight flag 60, and two mounting brackets 62 and 64. The fixed vertical member 58 includes a first terminal end 73 suitable for attaching the sight flag 60. The second terminal end 74 of the fixed vertical member 58 has a contoured shape suitable for load bearing. Mounting brackets 62 and 64 are comprised of horizontal members 61 and 63, sliding collars 66 and 68, and magnetic fasteners 70 and 72. The sliding collars 66 and 68 are attached to the terminal ends of horizontal members 61 and 63 and include holes therein whereby fixed vertical member 58 is slidably engaged. The magnetic fasteners 70 and 72 are attached to the opposite terminal ends of horizontal members 61 and 63. The magnetic fasteners 70 and 72 are rectangular in shape, including a smooth surface on the side opposite the side whereby horizontal members 61 and 63 are attached. Although the embodiment of the invention shows the magnetic fasteners 70 and 72 as rectangular in shape, they can be constructed in circular, angular or other shapes.

Figure 7:
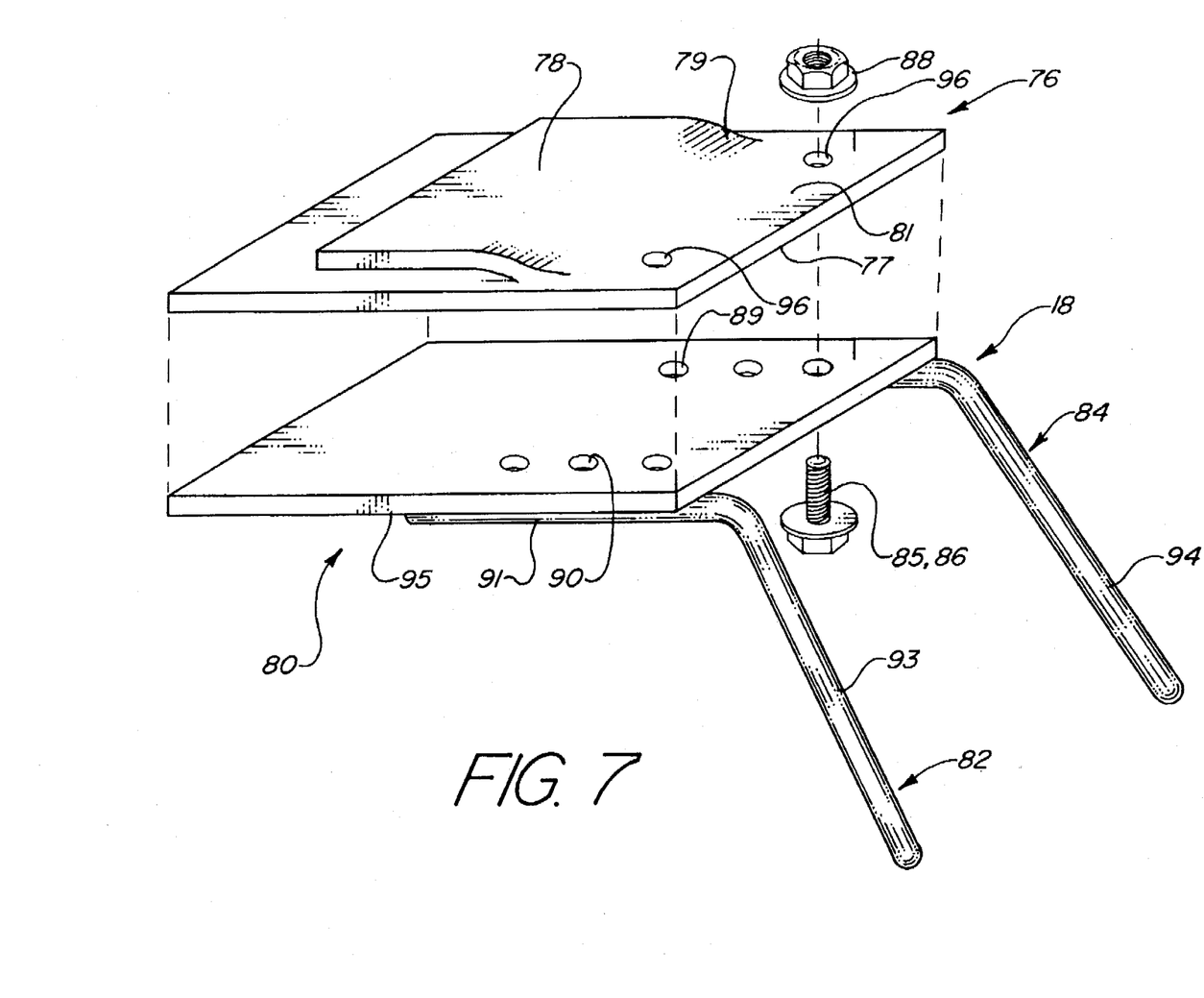
FIG. 7 is a perspective view of the stop brace.
Figure 8:
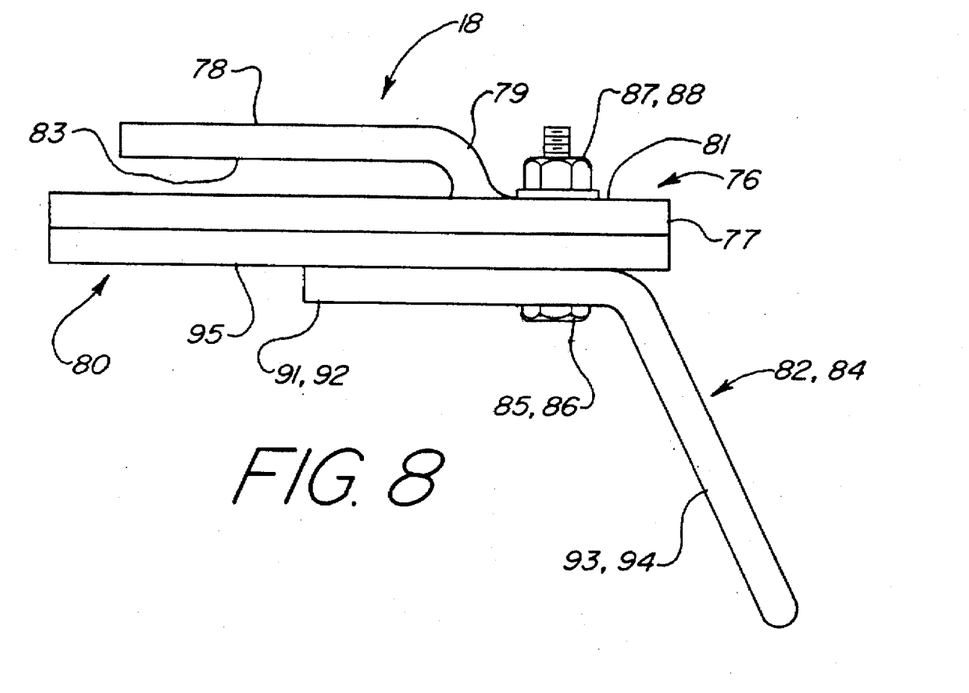
FIG. 8 is an elevational view of the stop brace.
Figure 9:
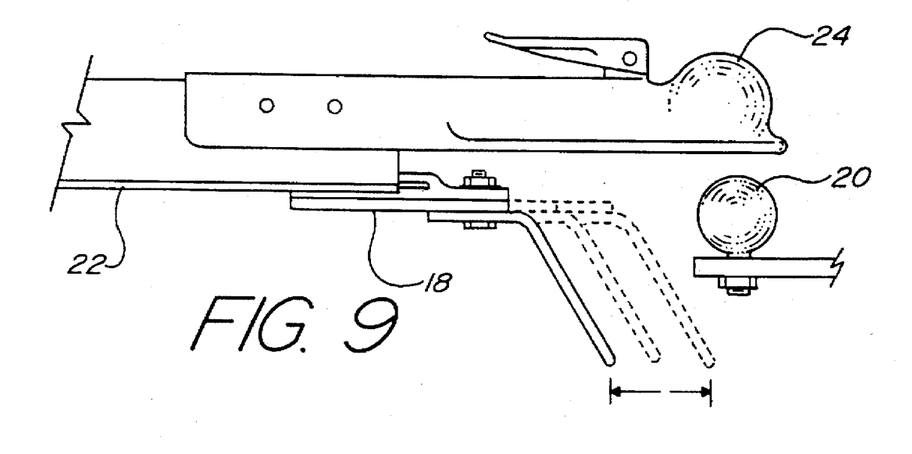
FIG. 9 is an elevational view of the stop brace mounted to the trailer hitch tongue and illustrating the adjustment and alignment of the stop brace relative to the trailer hitch tongue and the towing ball.
Figure 10:
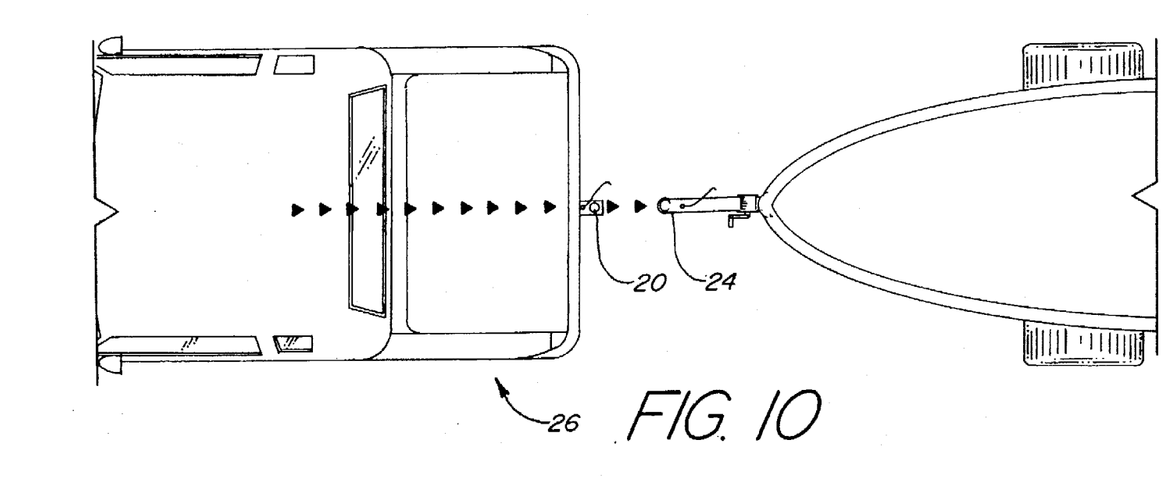
FIG. 10 is a plan view of the embodiment of the invention illustrating diagrammatically the operation of the embodiment of the invention.
Figure 11:
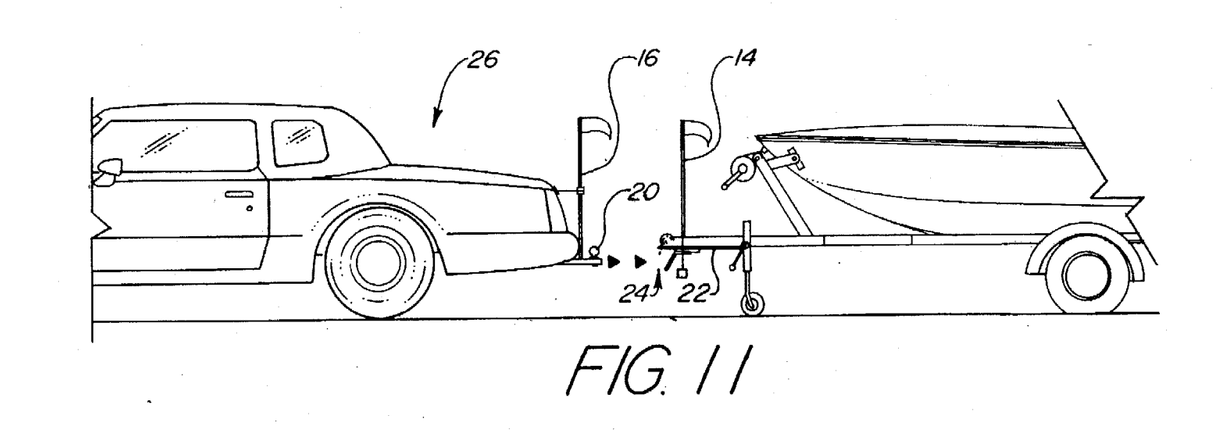
FIG. 11 is an elevational view of the embodiment of the invention illustrating diagrammatically the operation of the embodiment of the invention.

As shown in FIGS. 7 and 8, the stop brace 18 comprises a top plate 76, a top plate tongue 78, a bottom plate 80, two stop bars 82 and 84 two stop brace bolts 85 and 86 and two stop brace nuts 87 and 88.

As shown in FIG. 7, top plate 76 is rectangular in shape and includes two holes adjacent forward end 77. The top plate tongue 78 is rectangular in shape having a flange 79 attached to the top plate 76. The flange 79 of the top plate tongue 78 is attached to the top plate 76 such that the bottom surface 83 of the top plate tongue 78 is parallel to and separated from the top surface 81 of the top plate 76. The bottom plate 80 is rectangular in shape and includes two parallel rows of holes 89 and 90. The stop bars 82 and 84 are shaped such that an angle other than 180 degrees is defined by the attaching sections 91 and 92 and the extending sections 93 and 94. The attaching sections 91 and 92 are attached to the bottom surface 95 of the bottom plate 80, such that the extending sections 93 and 94 project beyond the front edge of the bottom plate 80. The top plate 76 is secured to the bottom plate 80 by bolts 85 and 86 and nuts 87 and 88. The bolts 85 and 86 are passed through a selected pair of holes 89 and 90 in bottom plate 80 and through the holes 96 in top plate 76. The nuts 87 and 88 are attached to the bolts 85 and 86 in order to secure the top plate 76 to bottom plate 80. By selecting the appropriate pair of holes 89 and 90, the position of the bottom plate 80 to the top plate 76 can be adjusted.

In operation, the preferred embodiment of the invention is installed by first inserting the top plate tongue 78 of the stop brace 18 into the trailer tongue 22 at the end 25 of the bottom 23 of the trailer tongue 22. Next, the pivoting sight member 14 is mounted vertically on the flange of the trailer hitch socket 24 by balancing the second terminal ends 54 and 56 of the pivoting sight member 14 on the flanges on opposite sides of the trailer hitch socket 24. The position of the pivoting sight member 14 on the flange of the trailer hitch socket is determined by the final position of the third section 36C of the multi-angular member 36 of the pivoting sight member 14. When the third section 36 is in approximate alignment with the vertical centerline of the trailer hitch socket 24 and in front of and in between the stop bars 85 and 86 of the stop brace 18, the pivoting sight member is correctly mounted. Finally, the fixed sight member 16 is mounted on top of the towing vehicle hitch 21 immediately behind the towing ball 20. The mounting brackets 62 and 64 are secured and positioned on to the towing vehicle 26 such that the fixed sight member stands upright in a vertical posture.

Once the preferred embodiment is installed, the driver of the towing vehicle 26 backs up slowly towards the trailer tongue 24 attempting to keep the sight flag 28 of the pivoting sight member 14 in alignment with the sight flag 60 of the fixed sight member 16. When the towing ball 20 makes contact with the third section 36C of the pivoting sight member 14 the pivoting sight member 14 is activated and begins to pivot. This notifies the driver of the towing vehicle 26 that the towing ball 20 is in approximate alignment with trailer socket 24. At this point the trailer socket 24 can be lowered onto the towing ball 20 and attachment is accomplished.

The instant invention is simple in concept, economic to manufacture, and very effective. The construction could be of materials such as metal, plastic or other rigid material. The simple means for mounting both the fixed sight member and the pivoting sight member to their respective socket and ball locations is adequate to maintain the members upright even under adverse conditions. Removal of the members, as well as their initial mounting, is extremely simple and can be done in seconds.

The invention is an ideal, simple, and direct solution to a problem that has been plaguing the drivers of towing vehicles ever since the inception of the trailer and towing vehicle system.

What is claimed is:

1. A trailer-towing vehicle-trailer hitch alignment device for aligning a ball of a towing vehicle with a socket defined in a tongue of a trailer, comprising:

(a) a fixed sight member having means for removably attaching said fixed sight member to a rear portion of a towing vehicle in a vertical position;

(b) a stop brace having means for removably and adjustably attaching said stop brace to trailer tongue, whereby said stop brace can be positioned such that when a towing vehicle ball is moved towards said trailer tongue, said stop brace contacts said towing vehicle ball before said trailer tongue contacts said towing vehicle; and (c) a pivoting sight member having a lower portion that extends below said trailer tongue and having means for pivotally mounting said pivoting sight member to said trailer tongue whereby said pivoting sight member remains in a vertical position when undisturbed and pivots when said towing vehicle ball moves into vertical alignment with a trailer tongue socket and contacts said lower portion of said pivoting sight member.

2. A trailer-towing vehicle-trailer hitch alignment device for aligning a ball of a towing vehicle with a socket defined in a tongue of a trailer, comprising:

(a) a pivoting sight member having a lower portion that extends below a trailer tongue and having means for pivotally mounting said pivoting sight member to said trailer tongue whereby said lower portion of said pivoting sight member is vertically aligned with a trailer tongue socket;

(b) A weighted member, removably attached to said lower portion of said pivoting sight member, having enough weight whereby said pivoting sight member remains in a vertical postion when undisturbed and pivots when a towing vehicle ball moves into alignment with a vertical centerline of said trailer tongue socket and contacts said lower portion of said pivoting sight member;

(c) A fixed sight member having means for removably attaching said fixed sight member to a rear portion of said towing vehicle in a vertical position; and (d) a stop brace having means for removably attaching said brace to an underside of said trailer tongue and having means for adjusting a position of said stop brace relative to a horizontal centerline of said trailer tongue whereby when said towing vehicle ball moves towards said trailer tongue said stop brace contacts said towing vehicle ball before said trailer tongue contacts said towing vehicle.

3. A trailer-towing vehicle-trailer hitch alignment device for aligning a ball of a towing vehicle with a socket defined in a tongue of a trailer, comprising:

(a) a fixed sight member having an upper portion and a lower portion, said lower portion having a contoured terminal end;

(b) at least two fixed sight member mounting brackets, said fixed sight member mounting brackets having first terminal ends with means for slidably attaching said first terminal ends to said fixed sight member and second terminal ends with means for removably attaching said second terminal ends to a rear surface of said towing vehicle;

(c) a pivoting sight member having a lower portion extending below said trailer tongue and having means for pivotally mounting said pivoting sight member to a trailer tongue whereby said lower portion is in vertical alignment with a trailer tongue socket;

(d) a weighted member, removably attached to said lower portion of said pivoting sight member, having enough weight whereby said pivoting sight member remains in a vertical postion when undisturbed and pivots when a towing vehicle ball moves into vertical alignment with a trailer tongue socket and contacts said lower portion of said pivoting sight member; and (e) an adjustable stop brace having means for removably attaching said stop brace to a underside of said trailer tongue and having means for adjusting horizontally a postion of said stop brace relative to said trailer tongue and having two stop bars attached to an underside of said stop brace, said stop bars extending at an acute angle below said stop brace such that when said towing vehicle ball is moved towards said trailer tongue, said stop bars contact said towing vehicle ball before said trailer tongue contacts said towing vehicle.

4. A trailer-towing vehicle-trailer hitch alignment device as recited in claim 3 wherein the pivoting sight member comprises:

(a) a staff member having an eyelet at one end;

(b) two L-shaped pivot members, said L-shaped members having an eyelet at one end and a fulcrum at an opposite end;

(c) fastener means for attaching said staff member to said L-shaped members, said fastener means passing through said staff member eyelet and said L-shaped member eyelets; and, (d) a multi-angular shaped member having one end attached to one of said L-shaped members, said multi-angular shaped member being shaped such that a lower portion is in vertical alignment with a trailer tongue socket and having a hook attached to said lower portion.

5. A trailer-towing vehicle-trailer hitch alignment device as recited in claim 3 wherein the stop brace comprises:

(a) an upper plate having flange means for slidably engaging said underside of said trailer tongue;

(b) a lower plate having two stop bars attached to an underside of said lower plate and extending at an acute angle below said lower plate; and (c) means for removably attaching said lower plate to said upper plate and for adjusting horizontally a position of said lower plate relative to said upper plate and said trailer tongue, whereby when said towing vehicle ball moves towards said trailer tongue said stop bars contact said towing vehicle ball before said trailer tongue contacts said towing vehicle.

* * * * *